United States Patent
Miceli

(10) Patent No.: US 8,514,234 B2
(45) Date of Patent: Aug. 20, 2013

(54) METHOD OF DISPLAYING AN OPERATING SYSTEM'S GRAPHICAL USER INTERFACE ON A LARGE MULTI-PROJECTOR DISPLAY

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 12/836,257

(22) Filed: Jul. 14, 2010

(65) Prior Publication Data

US 2012/0013638 A1   Jan. 19, 2012

(51) Int. Cl.
G09G 5/399 (2006.01)
(52) U.S. Cl.
USPC ............................. 345/539; 345/545; 345/619
(58) Field of Classification Search
None
See application file for complete search history.

(56) References Cited

U.S. PATENT DOCUMENTS

| | | | | | |
|---|---|---|---|---|---|
| 4,823,108 | A | * | 4/1989 | Pope | 715/806 |
| 5,923,307 | A | * | 7/1999 | Hogle, IV | 345/4 |
| 6,157,395 | A | * | 12/2000 | Alcorn | 345/506 |
| 6,278,546 | B1 | * | 8/2001 | Dubin et al. | 359/452 |
| 6,664,968 | B2 | * | 12/2003 | Ono | 345/532 |
| 6,779,187 | B1 | * | 8/2004 | Hammond | 719/331 |
| 6,909,406 | B2 | * | 6/2005 | Wilburn et al. | 345/3.1 |
| 6,919,900 | B2 | * | 7/2005 | Wilt | 345/535 |
| 7,193,652 | B2 | * | 3/2007 | Hori et al. | 348/362 |
| 7,439,937 | B2 | * | 10/2008 | Ben-Shachar et al. | 345/1.1 |
| 7,982,741 | B2 | * | 7/2011 | Noyle et al. | 345/502 |
| 8,264,421 | B2 | * | 9/2012 | Yamada et al. | 345/1.1 |
| 2003/0071818 | A1 | * | 4/2003 | Wilt et al. | 345/537 |
| 2004/0172508 | A1 | * | 9/2004 | Nguyen et al. | 711/162 |
| 2005/0068253 | A1 | * | 3/2005 | Bartels | 345/1.3 |
| 2008/0007700 | A1 | * | 1/2008 | vanBaar et al. | 353/94 |
| 2009/0102838 | A1 | * | 4/2009 | Bullard et al. | 345/419 |
| 2011/0007084 | A1 | * | 1/2011 | Park et al. | 345/549 |

OTHER PUBLICATIONS

Li, Chao, et al., "Multi-Projector Tiled Display Wall Calibration With a Camera", Proceedings of SPIE-IS&T Electronic Imaging, 294-301, SPIE vol. 5668, 2005.*
Wallace et al., "DeskAlign: Automatically Aligning a Tiled Windows Desktop", Dept. of CS, Princeton University, Princeton, NJ, 08544, Oct. 2003, pp. 1-7.*
Li, et al., "Multi-Projector Tiled Display Wall Calibration With a Camera", Proceedings of SPIE-IS&T Electronic Imaging, pp. 294-301, SPIE vol. 5668, 2005.*
DeskAlign: Automatically Aligning a Tiled Windows Desktop, Grant Wallace, Han Chen and Kai Li, Department of Computer Science, Princeton University, Princeton, NJ 08544, Oct. 2003, (pp. 1-7).

(Continued)

*Primary Examiner* — Daniel Hajnik
*Assistant Examiner* — William Beutel

(57) ABSTRACT

The display of a Windows Desktop is modified using one or more processors (e.g. CPUs and/or GPUs) that re-direct drawing of the Desktop to mirrored swap chain buffers; modify the contents of the a front buffer of the mirrored swap chain buffers; and draw the Desktop using the modified contents of the front buffer of the mirrored swap chain buffers. To modify the displayed Desktop, Windows needs to draw into these mirrored swap chains instead of its own. To accomplish this, all Direct3D functions that use a swap chain are hooked so that they return the mirrored swap chain, and any function that uses the contents of the swap chain are hooked. Basically any function that takes a Direct3D surface or texture is hooked and the respective item from the mirrored swap chains is returned if it is in the mirrored swap chain data structures.

3 Claims, 14 Drawing Sheets

(56) References Cited

OTHER PUBLICATIONS

High-resolution multi-projector display walls and applications, Daniel R. Schikore, Richard A. Fischer, Randall Frank, Ross Gaunt, John Hobson and Brad Whitlock, Lawrence Livermore National Laboratory, Jul. 2000, (pp. 1-7).

PixelFlex: A Reconfigurable Multi-Projector Display System, Ruigang Yang, David Gotz, Justin Hensley and Herman Towles, Department of Computer Science, University of North Carolina at Chapel Hill, Michael S. Brown, Department of Computer Science, University of Kentucky, Proceedings of the conference on Visualization, Oct. 2001, (pp. 1-9).

* cited by examiner

| Windows Text Function | DLL function is in | How coordinates are specified |
|---|---|---|
| DrawTextA | User32.dll | bounds |
| DrawTextW | User32.dll | bounds |
| DrawTextExA | User32.dll | bounds |
| DrawTextExW | User32.dll | bounds |
| TextOutA | Gdi32.dll | point |
| TextOutW | Gdi32.dll | point |
| ExtTextOutA | Gdi32.dll | point |
| ExtTextOutW | Gdi32.dll | point |
| TabbedTextOutA | User32.dll | point |
| TabbedTextOutW | User32.dll | point |
| PolyTextOutA | Gdi32.dll | array of points |
| PolyTextOutW | Gdi32.dll | array of points |

FIG. 13

METHOD OF DISPLAYING AN OPERATING SYSTEM'S GRAPHICAL USER INTERFACE ON A LARGE MULTI-PROJECTOR DISPLAY

CROSS-REFERENCE TO RELATED APPLICATIONS

This application is related to commonly owned U.S. patent application Ser. No. 12/549,011, filed Aug. 27, 2009, U.S. patent application Ser. No. 12/728,838, filed Mar. 22, 2010, U.S. patent application Ser. No. 12/730,470, filed Mar. 24, 2010, and U.S. patent application Ser. No. 12/501,162 filed Jul. 10, 2009, which are hereby incorporated by reference in their entirety.

FIELD OF INVENTION

Generally, the present invention relates to modifying the display of the Microsoft Windows Desktop. More particularly, the present invention relates to displaying the Microsoft Windows Desktop across a multi-projector display.

BACKGROUND

With an ever growing desire to see more information with better quality, large-screen displays have become quite popular. Increasing screen resolutions and sizes are continually emerging and made available in televisions, computer monitors, and other video devices. Until recently, large screen displays were typically too costly, physically unwieldy, or simply unavailable. Video projectors provided one solution, enabling a wide range of communication and entertainment functions by offering a significantly greater display area relatively inexpensively. These devices have found application in conference rooms for presentations, home theaters, classroom training, and advertising billboard displays.

Similar to other video device technologies, video projectors continue to advance their displayable pixel resolution and light output. Today commodity projectors are brighter, offer better quality, and are often less expensive than those of prior years. Highly portable projectors (in both weight and size) are also becoming readily available. No longer do commodity projectors remain constrained to dimly lit rooms with well prepared display surfaces. A video projector's small physical size relative to its large projection output therefore remains appealing.

Even with these improvements, however, it is still difficult or impossible for a single commodity projector to achieve very high resolutions, project over vast areas, or create bright projections on very bright surface areas (for example, near day lit windows). Applications demanding such display qualities, however, are becoming more desirable. The benefits of increased resolution, brightness, and larger display surface area have proven useful for reaching larger audiences and providing full-scale life-sized immersive environments. Unfortunately, construction of such large displays is complex and costly.

One common technique, such as grouping multiple projectors together and tiling their projection output to produce large screen displays of any desired size, presents challenging problems with registration (that is, alignment of projector pixels). Color and luminosity variance across separate devices and even within a given device is difficult to correct. Minor shape or geometric inconsistencies of the display surface can also hinder adequate results. Projector lumens, or light output, may not be adequate for brighter locations. Synchronizing content delivery to the individual components forming the larger display are additional hurdles to solve. Some of these problems apply to single-projector displays as well.

Solutions to some of these system problems take many forms. Many require precise pixel and color alignment using manual methods that require physical adjustment of the projector placement. If the output pixels from one projector are not close enough to those from another projector, a visible gap may occur between the projections on the composite display. Likewise, overlapping pixels across projectors produce bright seams that are also objectionable. High-end projectors with specialized lens optics or edge blending/blurring filters may be available to reduce some of these problems, but are far from optimal.

Specialized projectors and mounting hardware, measurement tools, and tedious calibration methods are additional requirements that add to the resource costs and complexities of physical projector alignment which can become too demanding for the average user. The advanced skills and time requirements are more than most will invest. In many configurations, physical alignment may even be impossible using projectors with limited optic pathways, or with even slightly irregular display surfaces. When changes are necessary to replace failed lamps, the calibration methods often need repeating.

What is needed is a system that provides an easy calibration and playback mechanism offering the typical user an automated method to create a composite display from one or more commodity projectors, even in the presence of high ambient light levels. This method should offer a relatively quick one-time calibration function to be performed once after casual projector placement or changes. Commonly owned U.S. patent application Ser. No. 12/549,011, filed Aug. 27, 2009 and U.S. patent application Ser. No. 12/728,838, filed Mar. 22, 2010 address these problems with calibration techniques that allow easy set-up of a multiple-projector system.

However, one issue that our previous techniques do not address is the display of the Microsoft Windows Desktop across the multiple-projector display. Due to the nature of the standard Windows Application Programming Interface (API), the display of the Windows Desktop can look uneven at the overlaps of the multiple displays.

SUMMARY OF INVENTION

The present invention modifies the display of a Windows Desktop using one or more processors (e.g. CPUs and/or GPUs) that re-direct drawing of the Desktop to mirrored swap chain buffers; modify the contents of the a front buffer of the mirrored swap chain buffers; and draw the Desktop using the modified contents of the front buffer of the mirrored swap chain buffers. To modify the displayed Desktop, Windows needs to draw into these mirrored swap chains instead of its own. To accomplish this, all Direct3D functions that use a swap chain are hooked so that they return the mirrored swap chain, and any function that uses the contents of the swap chain are hooked. Basically any function that takes a Direct3D surface or texture is hooked and the respective item from the mirrored swap chains is returned if it is in the mirrored swap chain data structures. If the item cannot be found in the data then the item is return. This means that it is an item that DWM created and is not an item from the swap chain.

In the present invention the one or more processors place injected code inside a dynamic link library (DLL); inject the DLL into a Desktop Windows Manager (DWM); and hook Direct3D calls that are used to display the Desktop.

In another aspect of the present invention first and second video cards are used rather than a single shared video card, and the one or more processors further place each hooked Direct3D call in one of a first and second queue associated with the first and second video cards, respectively. This helps to speed up the display process where multiple video cards are used.

In another aspect of the present invention where multiple projectors display the Windows Desktop, the one or more processors further assign a Desktop display region to each one of the multiple projectors; identify a main Desktop display region that displays a taskbar and start menu; and shift the main Desktop display region until the main Desktop display region is in an upper left corner of a projected display. This ensures that the Desktop fits properly in the bounds of the projected display where two display projections are superimposed to achieve a super bright display.

In another aspect of the present invention the one or more processors further identify text in Desktop data to be displayed and apply a sharpening filter to the identified text. This aspect avoids blurry displayed text that results from the effects of transforming (mapping, blending, etc.) the Desktop data for the multiple-display projection.

In another aspect of the present invention the one or more processors substitute fonts of Desktop text data. In this aspect the displayed text "fits" (i.e. appears normal) even though the resolution of the projected display region may be smaller that the original Desktop resolution.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 13 is a table of Microsoft's text functions that need to be hooked in the text identification aspect of the present invention;

DESCRIPTION OF THE PREFERRED EMBODIMENTS

In the system that utilizes the present invention, camera-based registration of the multiple projectors is performed. During registration, one or more projectors project calibration images upon a display surface. A camera captures one or more images of each projected calibration image. A projector platform creates a mapping, for each projector, between pixel locations of the camera and pixel locations of the projector. After registration, the mappings are used to alter the images prior to projection so that seamless composite image can be displayed by the multiple projectors.

These mappings are stored in Virtual Pixel Map (VPM) files that form an accurate pixel registration map of each projector. Using the VPM files, each physical device pixel on a projector can be mapped to one or more logical pixels in a virtual region defining the large format display (composite image). This virtual large format display resolution defines the unit of each VPM pixel, which is a virtual pixel in the logical display region. It also defines the relative location of VPM pixels on one device relative to VPM pixels on another. The bounded display region represents a homogenous portion of the logical display region within which every pixel is addressable by at least one physical device pixel.

In order to project what appears to be a single continuous image, each individual projector's intrinsic and extrinsic parameters must all be in a common coordinate frame. This enables multiple projectors to generate a rectangular image of known aspect ratio. Projector platform 106 (FIG. 1) performs registration of the projectors to create an accurate pixel registration map of each projector.

The registration process can use one or both of two techniques to create the mappings. According to the first technique, a coarse mapping is created for each projector using striped calibration images, which can be generated using Gray codes. This technique can establish a mapping to within approximately sixteen pixels. According to the second technique, raster calibration images are used. When both techniques are used, a precise mapping can be created between pixel locations of the camera and pixel locations of the projector. The mappings can be used for correcting projection distortions such as keystoning, aligning multiple projections, and the like. Calibration and registration of multiple projectors can be performed using various techniques. An understanding of the present invention is not predicated on the knowledge of such techniques. However, a detailed discussion of our calibration techniques is provided in commonly owned U.S. patent application Ser. No. 12/549,011, filed Aug. 27, 2009 and U.S. patent application Ser. No. 12/728,838, filed Mar. 22, 2010, which are hereby incorporated by reference in their entirety.

Figure 1:
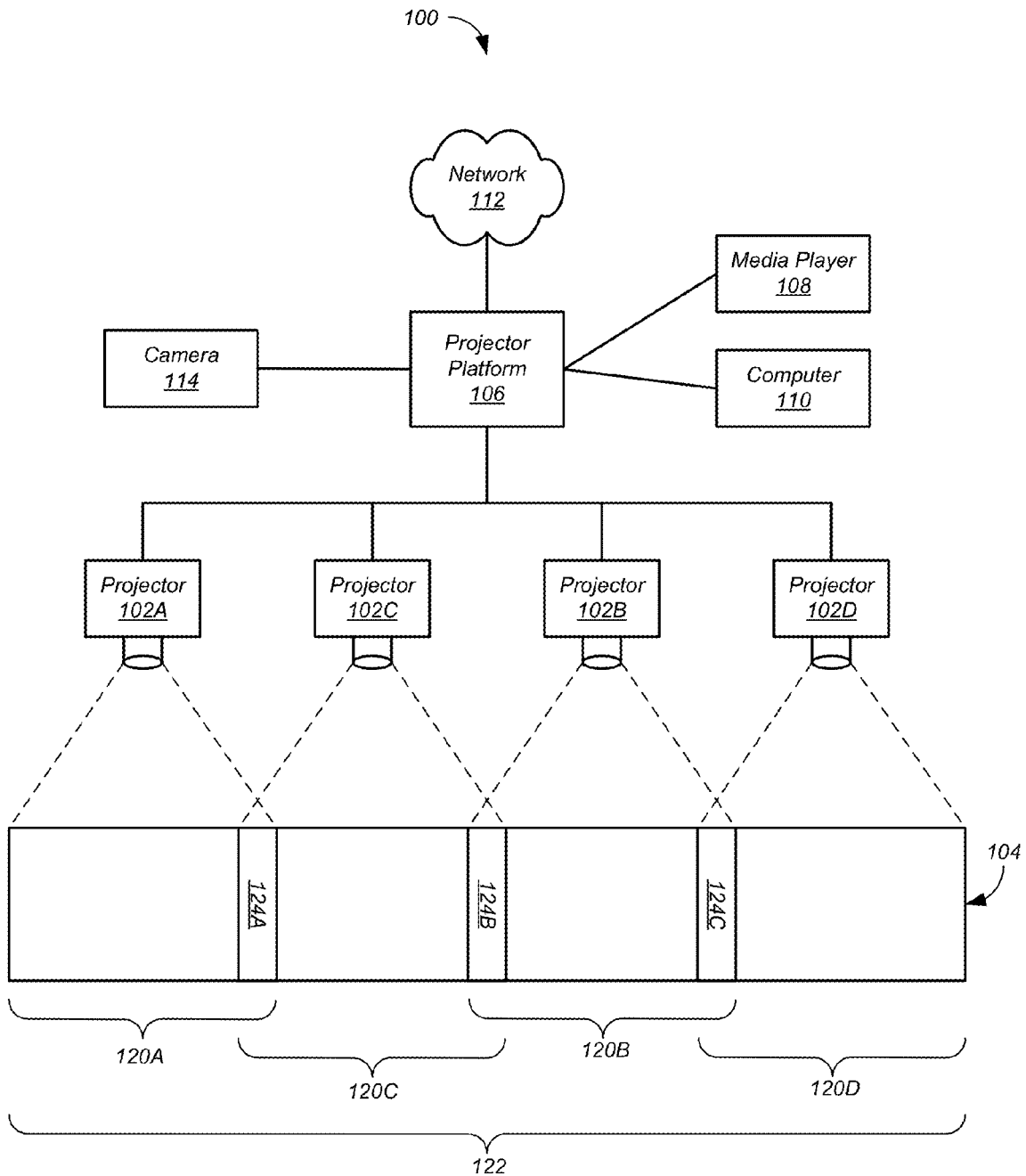
FIG. 1 is a general block diagram of the system of the present invention.

FIG. 1 shows a multi-projector display system 100 according to an embodiment of the present invention. System 100 includes four projectors 102A-102D aimed at a display surface 104. Of course, other numbers of projectors 102 can be employed. For example, two projectors 102 can be used. Data is provided to projectors 102 by a projector platform 106, which can obtain source input from a media player 108, a computer 110, a source connected by a network 112 such as the Internet, and the like. For calibration, system 100 includes a digital still camera 114.

In each embodiment of the present invention, unless specified otherwise, the method or steps discussed are performed by the projector platform 106, which is implemented as a personal computer (PC) configured with a central processing unit (CPU) and graphic processing units (GPUs). One or more of the processing units or "processors" is used to execute the method or steps under control of software or firmware stored in memory in the PC or in an external memory such as computer-readable media.

In an embodiment, system 100 includes four projectors 102, and projector platform 106 is implemented as a personal computer (PC) configured with a central processing unit (CPU) and graphic processing units (GPU) providing four video outputs, each connected to one of projectors 102. An optional capture card provides video input from sources such as computer 110, media player 108, and the like. Digital still camera 114 is attached to the PC for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

In the present invention using a large scale wall display using multiple projectors, it is desirable to run a Microsoft Windows System and see the normal working Windows Desktop on the multi-projector display.

Projector platform 106 maps each physical device pixel on a projector to one or more logical pixels in a virtual region defining the large format display (composite image) and blends the projections in the overlap regions to create one seamless large display using multiple projectors. The present invention is not concerned with or limited to a particular mapping scheme or blending algorithm. However, commonly owned U.S. patent application Ser. No. 12/549,011, filed Aug. 27, 2009 and U.S. patent application Ser. No. 12/728,838, filed Mar. 22, 2010 disclose calibration techniques that allow easy set-up of a multiple-projector system. Also, commonly owned U.S. patent application Ser. No. 12/730,470, filed Mar. 24, 2010 and U.S. patent application Ser. No. 12/501,162 filed Jul. 10, 2009 disclose methods and algorithms for determining optimal blending of the projector overlap regions.

Projector platform 106 uses N displays to combine multiple projections into a single seamless large display. Each projector 102A-D can utilize its own dedicated video card or be part of a multi-headed video card or any combination thereof.

Figure 2:
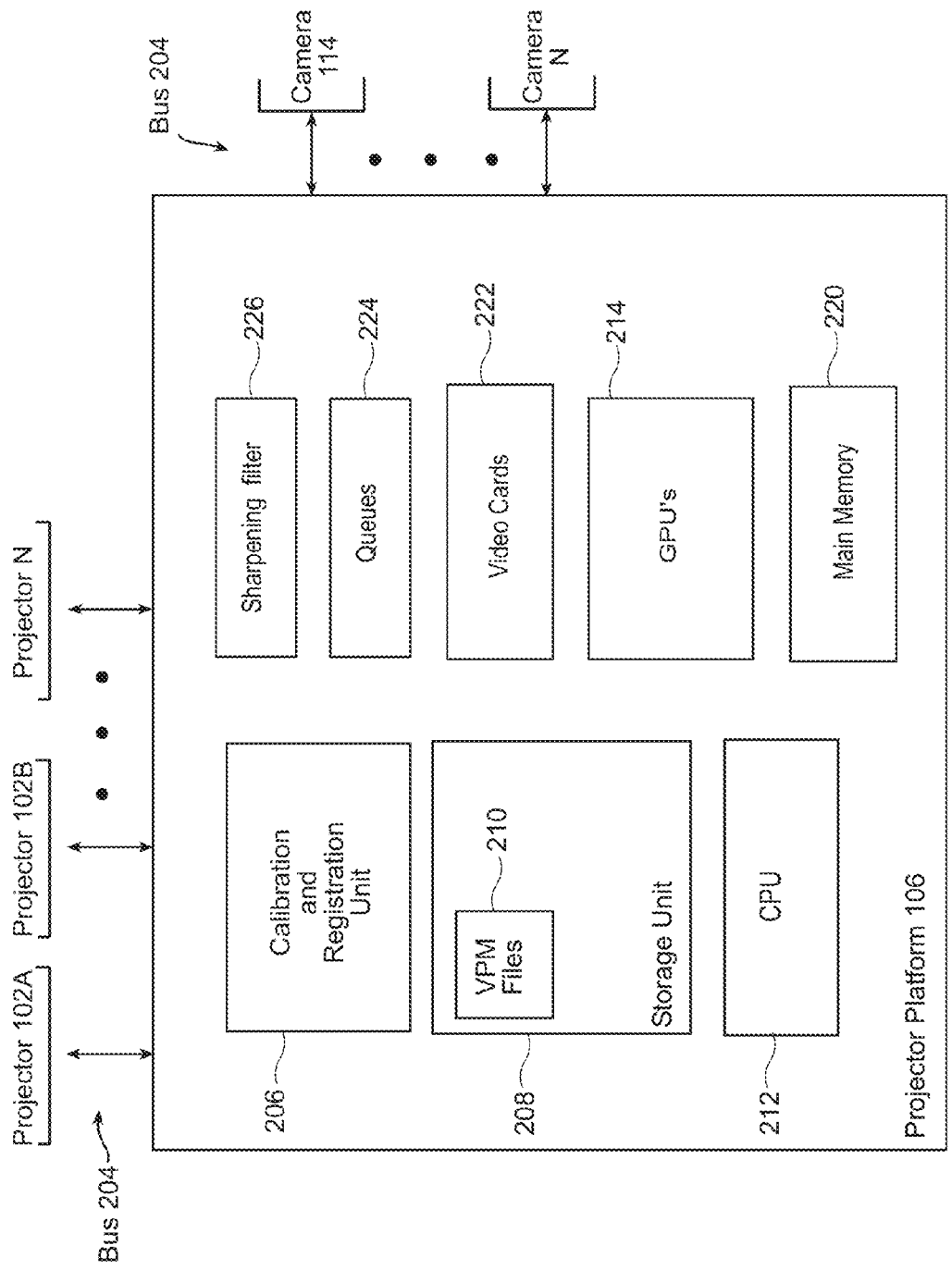
FIG. 2 is a general block diagram of the projector platform of the present invention.

FIG. 2 illustrates projector platform 106 in greater detail. Projector platform 106 interfaces with projectors 102A and 102B (shown in FIG. 1) and can further interface with a number of additional projectors up to projector N. Projector platform 106 also interfaces with camera 114 and can further interface with a number of additional cameras up to camera N. Communication between projector platform 106 and projectors/cameras is via bidirectional bus lines or via a common interface bus. These bus lines (or bus) are shown generally as bus 204 in FIG. 2.

Projector platform 106 may be implemented as a personal computer (PC) and will include various components, as is well known in the art. These will include, for example, a central processing unit (CPU) 212 and a main memory 220, which could include a hard drive, RAM, ROM, CD, etc. Main memory as used herein is all memory that can store, for example, the operating system, application programs, display software, etc. Projector platform 106 may also include one or more graphic processing units 214 (GPUs) to control the projectors. The GPUs allow for much faster processing of the displayed images, and are especially useful for displaying moving images. The GPU's 214 can be on the motherboard of projector platform 106, or more likely, will be on the one or multiple video cards 222. Projector platform 106, using CPU 212, GPUs 214, and other typical hardware/firmware and the software stored in main memory 220 will control projectors 102A and 102B to project images onto a screen or wall. Internal busses and connections within the projector platform 106 are omitted for clarity; but, as is well known, one or more busses and/or signal lines connect the various internal units to each other and to external devices such as the projectors and camera.

In order to project what appears to be a single continuous image, each individual projector's intrinsic and extrinsic parameters must all be in a common coordinate frame. This enables multiple projectors to generate a rectangular image of known aspect ratio. Projector platform 106 includes a calibration and registration unit 206 that creates an accurate pixel registration map of each projector. Each physical device pixel on a projector can be mapped to one or more logical pixels in a virtual region defining the large format display (composite image). This virtual region will be referred to herein as a virtual pixel map (VPM). This virtual large format display resolution defines the unit of each VPM pixel, which is a virtual pixel in the logical display region. It also defines the location of VPM pixels on one device relative to VPM pixels on another. The bounded display region represents a homogenous portion of the logical display region within which every pixel is addressable by at least one physical device pixel. There are numerous methods for creating a virtual pixel map such as grid or structured pattern registration but the present invention is not concerned with or confined by any particular method or algorithm for identifying the homography between the projectors and the camera(s). The projector platform 106 will refer to the virtual pixel map, which may be contained in VPM files 210 stored in storage unit 208 (e.g. memory), when controlling the projectors to project an image.

In order for the Windows Desktop to display across the multi-projector display the output of the entire desktop must run through projector platform 106 before the desktop is displayed so that the calibration of the multiple projectors and the blending of the overlaps are applied to the Windows Desktop, just like other images that are displayed by the multi-projector system. However the Windows Application Programming Interface (API) does not provide a way to accomplish this task.

The present invention controls the output of the Windows Desktop by inserting certain code into the Windows display system. The method of the present invention described below is limited to Windows Vista and later operating systems and only when the operating system uses a compositing window manager, such as when using Vista's Aero theme. This restriction arises because the display system that is controlled is DirectX, which is the API that the compositing Windows managers use for their output.

Certain aspects should be considered when implementing the present invention. Windows draws the desktop to the projectors whose projections are being modified to provide an overlapping continuous display. The effect of this is that the present invention cannot change what Windows is attempting to display. For example, the desktop size cannot be changed because Windows is attempting to display the size that it has set up. The view of each window has to be maintained in the corresponding position that Windows has set up. If any of these parameters are changed, the display will become corrupted or mouse tracking will be incorrect.

The following describes the code injection aspect of the present invention.

The compositing window manager that Windows currently uses is the Desktop Window Manager (DWM). It uses Direct3D to render its Desktop. Direct3D is a component of DirectX.

The method of the present invention injects code into the DWM process and takes control of its rendering by replacing some of the Direct3D API functions. The method to place code into another process is known as DLL injection.

Figure 3:
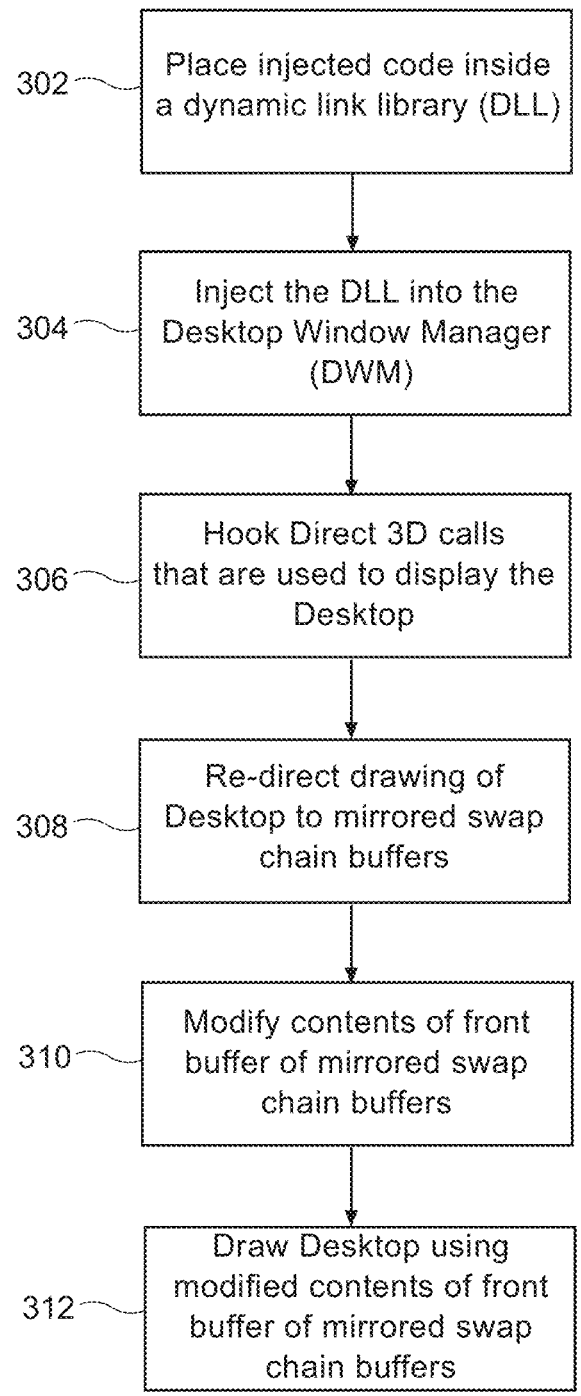
FIG. 3 is a flowchart of the overall process of the present invention.

FIG. 3 is a flowchart of the general process of the present invention.

All the injected code will be placed inside a DLL (dynamic link library)—step 302 in FIG. 3. The DLL will then be loaded inside the DWM process by the injector application. This process is shown generally as step 304 in FIG. 3 but is discussed in further detail as follows. The injector uses the Windows API call CreateRemoteThread to call a function in the DWM process. The first function called will be LoadLibrary with the full path name of the injected DLL.

The path name of the injected DLL is placed in the memory space of the DWM process. This way it can be used as an argument for the LoadLibrary call. To accomplish this, the VirtualAllocEx function is used to allocate memory for the path name in the DWM process. Then WriteProcessMemory is used to place the path name into DWM's memory space.

Now that the path name is in DWM's address space, CreateRemoteThread can be used to call LoadLibrary with the path name argument, but to do this the address of the LoadLibrary function in DWM's address space needs to be known. Fortunately it is at the same address as it is in the injectors address space.

The following are the steps to call a function in another process:
Get address of the function to call (in DWM's address space)
Copy arguments into the DWM process
Call CreateRemoteThread to execute the function Once the DLL is placed in the DWM process, its DllMain function is executed by the LoadLibrary process with the DLL_PROCESS_ATTACH argument. At this point the code in the DLL is being executed from inside the running DWM process. The Direct3D API's code could be replaced at this point, but it is precarious to replace code inside the DLLMain function.

In order to avoid problems, another function from the injected DLL is called to replace the Direct3D API functions. This is performed with a technique similar to the one discussed above. The only difference is finding the address of the initialization function in the address space of the DWM process. The address of the initialization function in the injector's address space and the DWM's address space will be different from each other.

Note that the offset from the beginning of the injected DLL is the same in all address spaces. This fact will be used to find the address in DWM's address space. What we need to be know is the address of the start of the DLL. This is basically what the return value of LoadLibrary is. This value is returned from CreateRemoteThread. Now any function from the injected DLL can be called from the injector application.

This technique is also used for calling the clean up function and unloading the DLL.

The following is a discussion of "code hooking" or code replacement function of the present invention. This process is shown generally as step 306 in FIG. 3 but is discussed in further detail as follows.

DWM uses Direct3D to perform its rendering. The basic algorithm is as follows:
draw updated areas of the desktop
call IDirect3DSwapChain9::Present The Present call is used to tell Direct3D that all drawing is finished and to update the display. This is the primary function that needs to be replaced or hooked.

To hook a function, a jump instruction needs to be placed at the start of the function that will be hooked. The jump will go to a replacement function instead of the injected DLL. A 32 bit jump instruction takes up 5 bytes. The first 5 bytes of the function that will be hooked needs to be replaced. Of course, these instructions that are overwritten still need to be called.

To write the jump instruction and address, the page that the code is in is marked as executable and read-only. The OS will not allow just anyone to write into the address space where there is code. First the code needs to call VirtualProtect to change the memory page to writeable. Now the jump instruction and address can be placed there.

Before the jump is placed, the old code is copied so that is can be restored later. The address of the hooked function is also recorded so that the original function can be called from the injected DLL if needed.

Now any function that is hooked will call into the injected DLL. Anything can be performed at this point, but mostly the program will call the original function to perform the normal work. Once the injected DLL function is called, this can be accomplished by writing the old instructions back to where the jump was placed and upon the return of the old function writing the jump back in place. This can be performed as follows, for example:

```
HRESULT SetRenderTarget)(IDirect3DDevice9* device, DWORD
  renderTargetIndex,
  IDirect3DSurface9 * pRenderTarget) {
  hook->placeOldCode( );
  HRESULT result = callOriginalSetRenderTarget(device,
  renderTargetIndex,
  pRenderTarget);
  hook->placeJumpCode( );
  return result;
}
```

One aspect that has not been mentioned is how to find the address of the function that needs to be replaced. A similar method that was used in the DLL injection is used. The offset of the interested function is calculated from the beginning of the Direct3D dll is found. This is complicated by the fact that DirectX uses COM (Component Object Model) interfaces as its API, thus there are no interesting functions that are exported from the DLL. The offset need be taken from the interface. This is primarily the Idirect3DDevice9 interface.

Each interface contains a pointer to a function table which references the respective function inside the Direct3D dll. All that is needed is the offset of the interested function from the start of this table. At the time a Direct3D function is to be hooked inside the DWM process, the injected DLL does not know this offset. The injector application can calculate this offset and pass it into the DLL through the DLL's shared memory segment, as follows:

$$UINT\_PTR\text{*}pVTable=\text{*}((UINT\_PTR\text{**})d3dDevice);$$

$$presentOffset=pVTable[DX9\_Present\_Offset]-(UINT\_PTR)d3dDll;$$

The DX9_Present_Offset in the above example is taken from the Direct3D headers that describe the interface.

The calculated offset can then be added to the start of the Direct3D dll to find the address of the function to be hooked.

The following describes the aspect of the present invention for modifying the Desktop so that it can be displayed across the multiple display regions.

Once the Direct3D Present function is hooked, the contents of the next front buffer can be copied, modified by the projector platform 106, and then placed back. Unfortunately, it is not this simple. Windows expects the front buffer to be maintained as it was, and it will update only regions that change. If this approach is used there will be screen corruption.

Direct3D maintains a ring of buffers that are to be displayed next. This is called the swap chain. Each display has its own swap chain. In the operation of DWM the first buffer in the swap chain is the front buffer that is displayed. The other buffer is the back buffer. DWM uses only two buffers in its swap chain.

Figure 4:
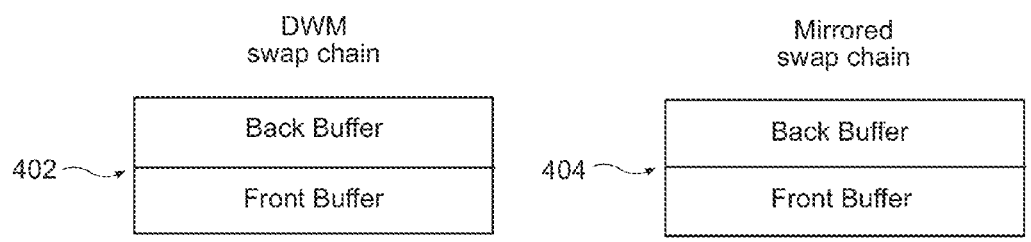
FIG. 4 is an illustration of the DWM and mirrored swap chains of the present invention.

To modify the Desktop for display in the multiple-display environment, the swap chain buffers are mirrored for each display (projector). By mirrored we mean corresponding data structures originating from the injected DLL are placed in the mirrored swap chain. FIG. 4 illustrates the DWM swap chain 402 and the mirrored swap chain 404. The back and front buffers are implemented, for example, as part of main memory 220, e.g. RAM, in projector platform 106 and/or in a memory in computer 110.

To modify the displayed Desktop, Windows needs to draw into these mirrored swap chains instead of its own. To accomplish this, all Direct3D functions that use a swap chain are hooked so that they return the mirrored swap chain, and any function that uses the contents of the swap chain are hooked. This is shown generally as step 308 in FIG. 3. Basically any function that takes a Direct3D surface or texture is hooked and the respective item from the mirrored swap chains is returned if it is in the mirrored swap chain data structures. If the item cannot be found in the data then the item is return. This means that it is an item that DWM created and is not an item from the swap chain.

The modification of the Windows Desktop for the multi-projector display can now occur. The modification happens in the hooked Present call (step 310 in FIG. 3). The front buffer of the mirrored swap chain is taken and drawn through the projector platform 106 (step 312 in FIG. 3).

The present invention has been described in terms of the multi-projector environment. However, it can be used to modify the Windows Desktop in any manner, for example, to animate the desktop or dim background windows. Basically, once the Direct 3D calls that are used to display the Desktop are hooked so that the drawing is re-directed through the mirrored swap chain buffer, any modification can occur.

Overlapped regions need to be drawn from each display to the other displays. As they are drawn each is drawn through the projector platform 106. To maintain each overlapped area a copy of the last presented front buffer is maintained for each swap chain. When the Present is called for each swap chain all other front buffer copies are drawn to each swap chains front buffer.

When there are multiple Direct3D 9 devices, the Present cannot be called during a BeginScene and EndScene block. To account for this BeginScene and EndScene are hooked. If the device is in a BeginScene and EndScene block and it is in the hooked Present call, the original Present will not be called. It will soon be called when that particular device's present is called and the update will happen correctly, as shown as follows, for example.

```
HRESULT HookedPresent(IDirect3DSwapChain9 *swapChain, CONST RECT*
pSourceRect,CONST RECT* pDestRect,HWND hDestWindowOverride,CONST
RGNDATA* pDirtyRegion,DWORD dwFlags) {
    mirroredSwapChain = mirroredSwapChainFor( swapChain );
    copy swapChain->frontBuffer to mirroredSwapChain->frontBufferCopy
    for each swap chain sc
        draw sc->frontBufferCopy to all other swap chains if they overlap
        if swap chain drawn into mark as needing display
    for each swap chain
        if not in BeginScene block and if swap chain marked needs display
            call original Present(swap chain)
}
```

30

For copying Direct3D surfaces between devices, first the surface needs to be copied to system memory then copied to the surface on the other device.

The above approach works well when there is only one multi-headed video display card shared by the projectors, but if the contents of the display overlap and need to be displayed on another video card, then the above method may be inadequate. The above approach of copying the portion of one display to the other may be too slow. The following discussion assumes that each projector has a dedicated video card, i.e. using multiple video cards 222 (FIG. 2).

Figure 5:
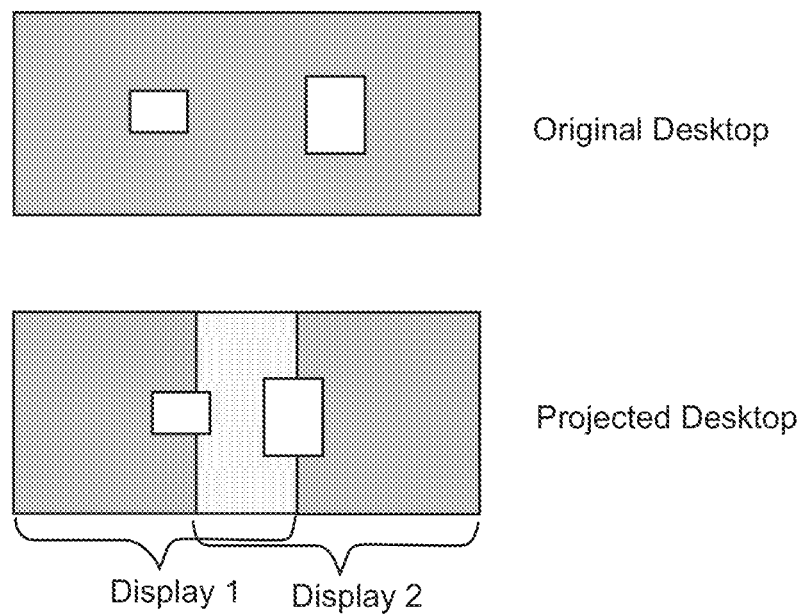
FIG. 5 shows a normal view of the Windows Desktop and the same Desktop as projected from multiple projectors.

For example, referring to FIG. 5, the original Desktop is the normal view of a desktop spanning two monitors. The projected Desktop is the same Desktop as the original, but it is scaled and modified to fit the view of two overlapped projected displays. Now if display 1 and display 2 in FIG. 5 are each on a separate video card then a portion of display 1 needs to be copied to display 2 and visa versa.

Figure 6:
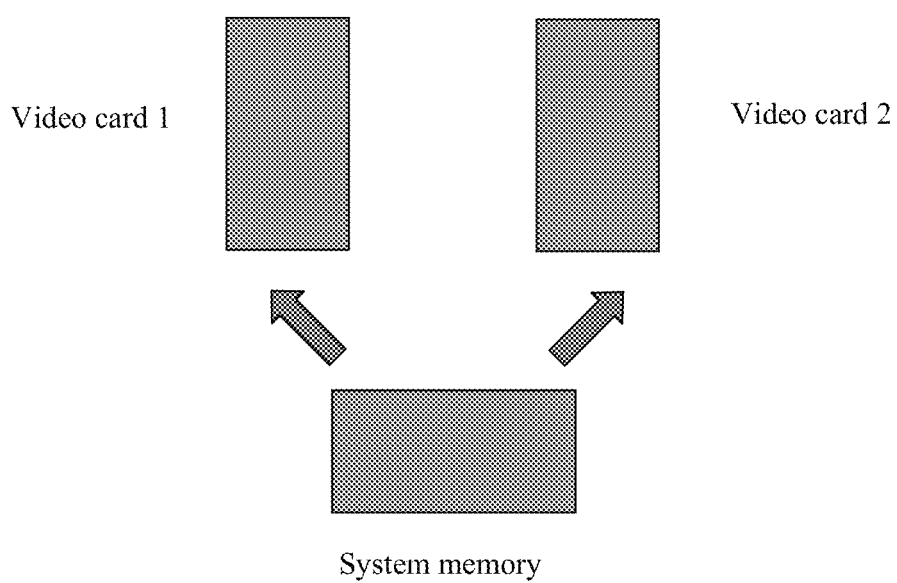
FIG. 6 illustrates the configuration for which video cards are optimized.
Figure 7:
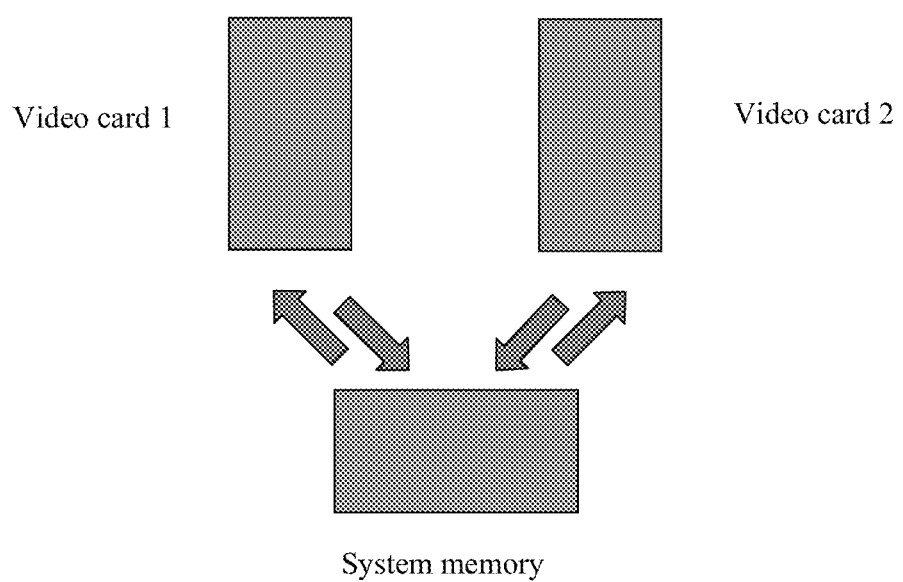
FIG. 7 illustrates the configuration in which data from two video cards are copied to each other.

The video cards are optimized for data being sent to them and not for reading data from the cards, as shown in FIG. 6. If the copying is done as described in the forgoing discussion and shown for example in FIG. 7, the process will be slow and may make the Desktop unusable. This is a result of video cards being optimized and also a result of bus contention between the cards.

Figure 8:
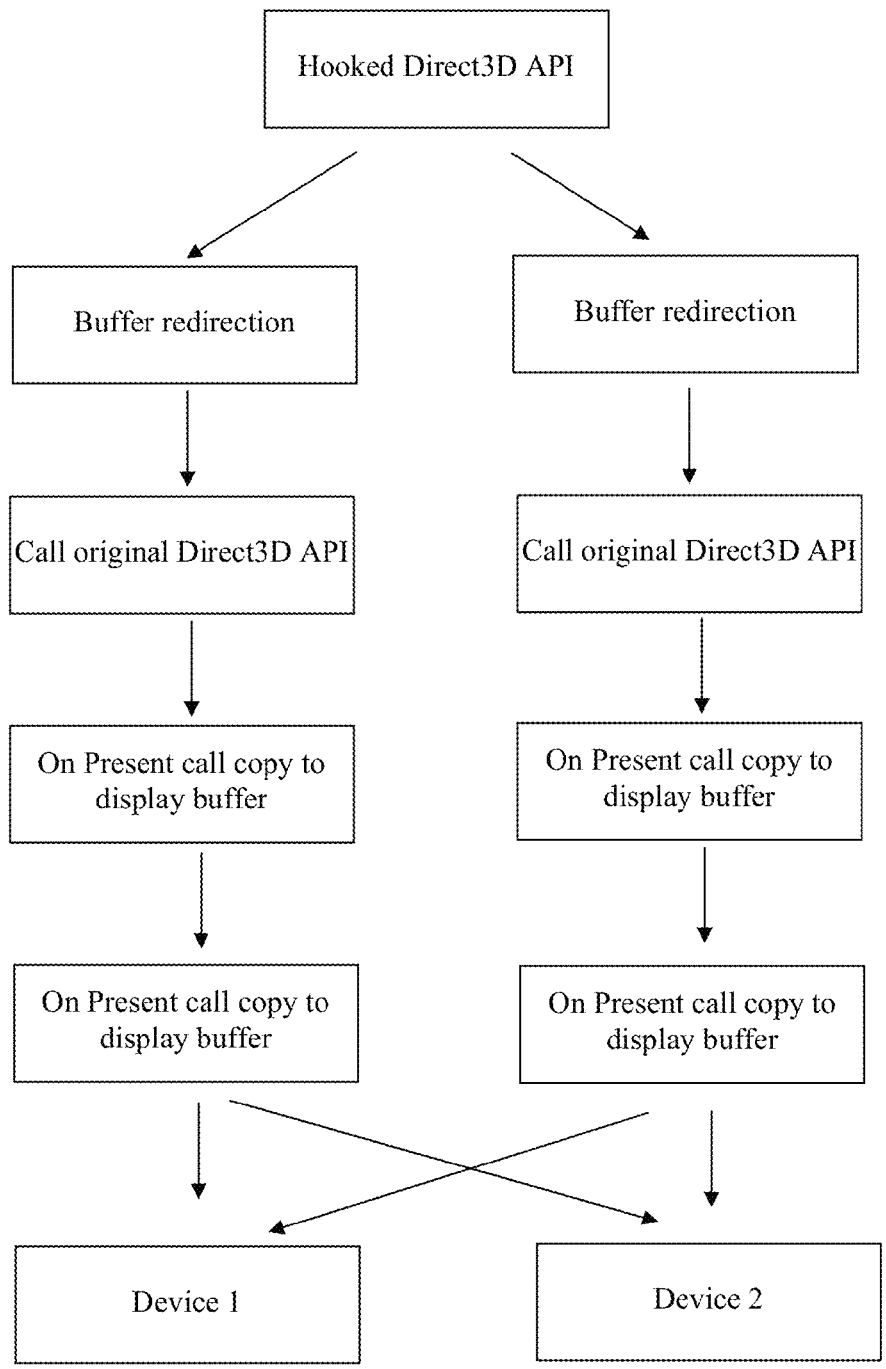
FIG. 8 shows the Direct3D hooking and data copying from two video cards.

The data needs to be read from each video card into system memory and copied from system memory to the other card. This process is slow and causes read/write contention on the bus. This situation arises from the way that Direct3D works and the hooking process. For each video card there is a Direct3D device associated with it. Each device has to copy data to each other device as shown in FIG. 8.

Instead of cross copying as discussed above, the present invention considers two other approaches. Cross copying lets each video card do the rendering for its display. Our other approaches are A) let one video card render the entire desktop and copy the needed portion to the other card, or B) have each video card render the entire desktop, perhaps omitting the portion that will never be displayed on that video card.

The issue is the ability to utilize either approach A or B while performing Direct3D hooking and the Desktop Windows Manager (DWM) as discussed above. The present invention, discussed as follows, will allow either approach A or B to be utilized.

In this embodiment, the hooked functions will no longer be simply passed through to the Direct3D Application Programming Interface (API). For each device (video card) a queue is inserted between the hooked function and the Direct3D API. Queues 224 (FIG. 2) may implemented as part of main memory 220. Each queue 224 will be responsible for collecting API calls and parceling them out to each respective Direct3D device (video card). This allows for the decoupling of the API calls from the device (video card).

To setup the environment the Direct3D API is hooked. Upon the Present call of the SwapChain, the virtualized environment is setup. The setup involves creating offscreen display buffers ((i.e. mirrored swap chain buffers 404 (FIG. 4)) as needed on or for each card. If the first approach A is used then only one offscreen buffer (one front buffer and one back buffer) the size of the entire desktop will be needed on the rendering card. If each card is going to render the desktop (approach B) then an offscreen buffer the size of each display is needed for each card. Also appropriate matrix transformations are set up so that rendering commands sent to each device will draw in the correct area of the buffers.

Figure 9:
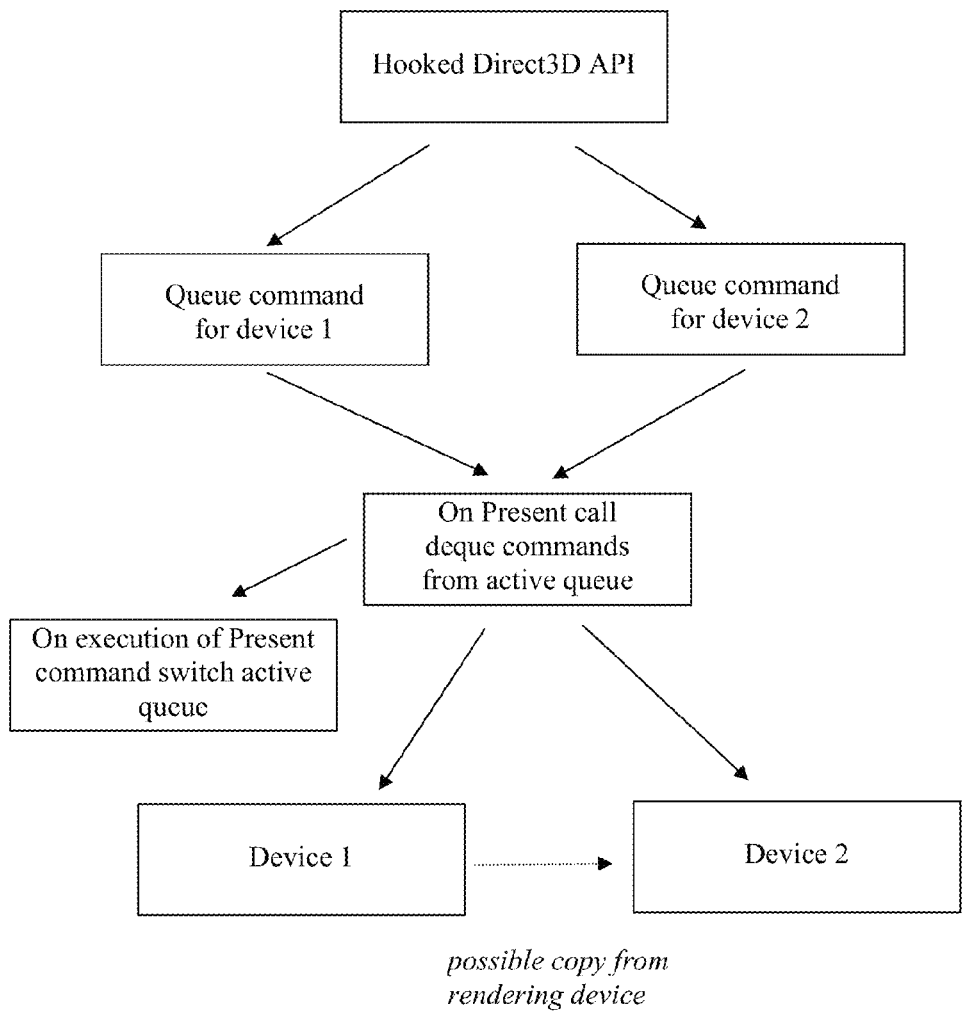
FIG. 9 shows the utilization of queues in the present invention to overcome the problems associated with the process of FIG. 8.

As each Direct3D API comes in it will be placed in that devices queue (FIG. 9). Most API calls involve a COM (Component Object Model) Dirct3X object. The referencing counting for the object is handled by incrementing the reference count when it is placed in the queue. The count will then be decremented up completion of the command.

On the SwapChain's Present call each device's queue will be sent to the appropriate device (video card). For approach A, both device's commands from each queue is sent to the video card of rendering device. For approach B, both device's commands will be sent to each device. The commands sent to a device can only be from the same queue until a Present command is executed. When the Present command is received the next queue is chosen as the active command queue. The active command queue is the queue that is currently sending commands to a device. Upon the switching of the active queue, the devices are be set up with the appropriate transformation matrix.

After the Present call is executed the offscreen buffer (front buffer of mirrored swap chain 404 can be modified (step 310 in FIG. 3), such as to modify the buffer's for display on the large scale projected display. For approach A, the portion of the offscreen buffer that needs to be displayed on the other video cards is copied at this point also.

The SwapChain's back buffers are mirrored as previously discussed. Errors are handling by returning the error from the Present call. This delays the error reporting, but is actually valid to do under the Direct3D API. API calls do not need to be executed by the video card at the time of call, they can queue it up and execute it later.

This reduces reading from the video card. In approach A, there is only one read of a partial buffer from the video card to system memory. In approach B, there are no reads from the video cards. Approach A is appropriate if the rendering time is more than the copy time from the rendering card to the secondary cards. Approach B is appropriate most other times.

What has been described is in the context of two video cards, but either approach A or B can be implemented for N video cards.

Figure 10:
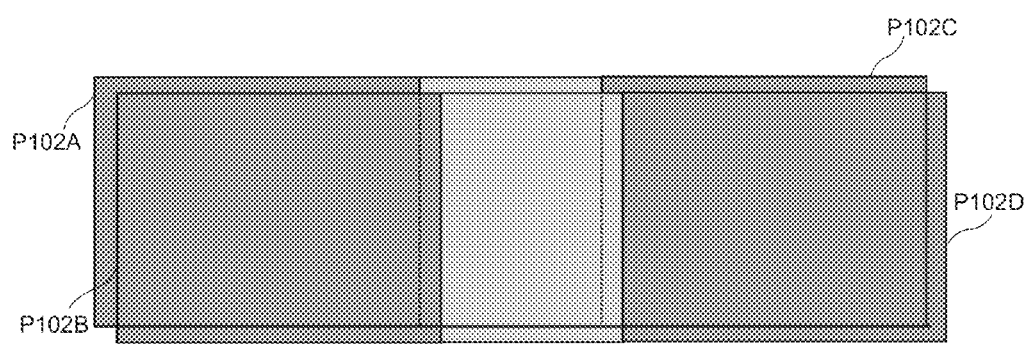
FIG. 10 illustrates a super bright projection mode with the projection of one projector superimposed on the projection of another.

Another feature of the present invention relates to a large seamless multi-projector display utilized in a "super bright mode" to yield a brighter display that is suitable for a daylight environment. This mode uses multiple projectors whose projections are superimposed upon each other to get the bright display. This mode can be configured in many ways. FIG. 10 illustrates an example using four projectors with two projectors P102A and P102C arranged side by side with the other two projectors P102B and P102D sitting on top of the first two projectors and having their projections superimposed on the projections of the first two projectors yielding a 2×1×2 (projection width, projection height, number of superimposed projection layers) sized display.

As described above, the multi-projector display is capable of displaying the Microsoft Windows Desktop. Microsoft does not provide an API to access the data of the Desktop in an efficient way. The display system needs to access and manipulate the Desktop data and redisplay it at frame rates of at least 60 fps. The Direct3d hooking method described above provides access to the Desktop data.

Once the Desktop data can be accessed and redisplayed in the multi-projector environment, the problem is how to layout the Desktop to fit in the bounds of the combined projected display. This is not always as quite straight forward as it might seem. The issues get a little more complex when there is a superimposed super bright display.

First we will discuss the simpler or common case, which is a non-super bright display. In this case, there are no superimposed displays. The projected displays will be in an N×1 layout (for example, two projectors side by side with just some projection overlap, i.e. a 2×1×1 layout). The desktop will also be in an N×1 layout.

A bounding box is always calculated for the projected displays. This is the largest rectangle that will fit inside of the union of the projected displays.

For this case the Desktop is scaled to fit the calculated bounding box. There are some problems with this approach that can not be remedied. First the effective area of the projected display is smaller than the display resolution. For example, for a single display the desktop resolution might be 1024×768 and the effective area of the projected display might be 928×692. This is due to the correction of projection geometry needed to correct for projector alignment among the multiple projectors and irregularities in the display surface.

The second issue is that the desktop resolution is a set of fixed sizes specified by the display hardware. In the above example it would be desirable to change the desktop resolution from 1024×768 to 928×692, but Microsoft does not allow for this in their API. Thus, the desktop needs to be scaled down to fit the effective resolution of the projected displays.

The third issue is the overlap area of the multiple projectors. This overlap further cuts down the effective resolution of the projected displays. For example when there is an overlap in the horizontal direction, the effective resolutions of the projected displays might be 20% smaller than the Desktop resolution. This further increases the amount that the Desktop will have to be scaled to fit the effective resolution of the projected display.

This case also holds up for the 1×N situation or the N×M situation where the desktop layout is also in the 1×N or N×M layout respectively.

Note that in these situations the layout of the projected displays mirrors that of the Desktops layout. The first projector contains the first display of the Desktop layout, the second projector contains most of the second display of the Desktop layout, and so forth. To maintain this mapping as much as possible helps improve the quality of the system. The closer that the Desktop display can be made one to one with the effective projected display the better.

Now we will discuss the more complex or not so common case, which is a super bright display.

Figure 11:
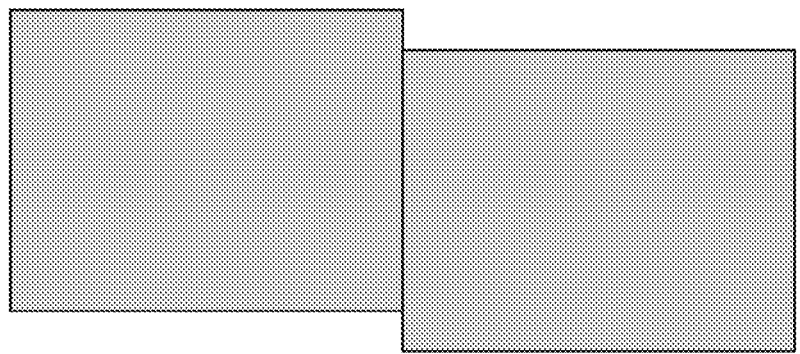
FIG. 11 shows a Desktop layout with non-aligned monitors.

Microsoft allows each monitor in the Desktop layout to be arranged in many ways. For example, the top edges of each monitor do not have to be aligned, they can be offset. This is shown for example in FIG. 11. In these cases, the extent of the union of the monitor bounds is used to scale the displays to fit the effective display area of the projected display.

This is also performed when the major axis of the desktop does not match the major axis of the projected displays. These cases are not ideal, but it is the responsibility of the user to set up the projectors in a way that is similar to the Desktop layout.

One of the issues with the super bright case is that one of the projected displays cannot be used to display Desktop data, but is used to redisplay a portion of the Desktop already displayed by another projector. These projectors are superimposed on top of one another to get a much brighter display.

For example in the 2×1×2 case there are four projectors connected to the system. Microsoft Windows expects all four to be used to display the desktop, so the layout of the desktop is say 4×1 with a total resolution of 4096×768. Meanwhile the effective resolution of the projected display might be 1722× 692. If the naïve scaling method used above for the common case is used, the projected desktop will be noticeably squeezed.

To avoid this problem the Desktop will be cropped to compensate for the extreme differences in Desktop size to projected desktop size.

The issue then becomes what portions of the desktop are going to be displayed on which projectors.

First is the determination of which projectors are superimposed. In the data structures the bounds of each projector are known in a common coordinate system.

The superimposed projectors are determined by:

```
for each projector p1
    for each projector p2
        if( intersect(p1, p2))
            if(p1 enclosed by p2) p1 and p2 are superimposed
            else if(p2 enclosed by p1) p1 and p2 are superimposed
                else if( area(p1) * 0.9 < area of intersection) p1 and p2
are superimposed
                else if(area(p2) * 0.9 < area of intersection) p1 and p2 are
superimposed
```

If p1 and p2 are superimposed then they will share the same coordinates in the Desktop coordinate system, but only one will be used to determine the Desktop layout.

Now the Desktop regions are assigned to each projector. This will be done according to the major axis. If the major axis is the x axis then the regions will be assigned from left to right, top to bottom. If the major axis is the y axis then the regions will be assigned from top to bottom, left to right. The assignment of the regions will be the same as the Desktop monitor layout. Each monitor will be assigned a region. If the region assigned is not large enough to cover the projected area (there are no more monitors to be assigned along that axis) then the previous region along the major axis will be scaled to fill the projected area. If there is not a major axis then it will be treated the same as an x major axis. This is consistent with most countries' reading order.

One complication is that of the Windows main display. This is the Desktop monitor that will display the taskbar and start menu. This portion of the Desktop should always be visible in the projected display. To accomplish this, the Desktop region of the main display will be placed in the upper left corner of the projected display. This will in effect be done by sliding the above assigned Desktop regions until the main display is in the upper left corner, if possible. This is done by calculating the number of display regions to the left (L) (including the main display region) subtracting the number of visible regions to the left (V) and adding in the number of display regions to the right R. The Desktop regions will be slid (shifted to the left) by this amount. The equation is n=L−V+R.

Similarly the equation for the vertical direction is n=T−V+ B, where T is the number of regions above the main display region (including the main display region), V is the number of visible regions, and B is the number of regions below the main display region.

Figure 12:
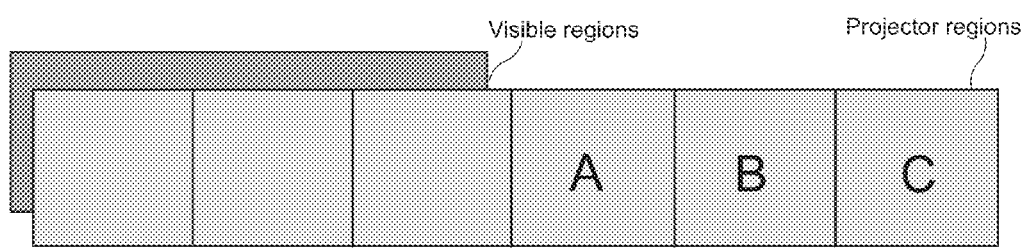
FIG. 12 illustrates an example shift of the main Desktop region in the present invention.

For example, as illustrated in FIG. 12 with a 3×1×2 display format, if A was the main desktop, the horizontal shift would be 3 regions (n=4−3+2). If B was the main desktop, the shift would be 3 regions (n=5−3+1).

As mentioned above, the projector platform 106 of the large scale multi-projector display system 100 modifies the image input to the projectors to seamlessly project that image on the display surface. When this system is used to display the Microsoft Windows Desktop, the transformation needed to display it may add some distortion to text. This distortion shows up mostly as blurry text.

There are a couple of factors that contribute to this. One is that the effective display area of the projected display is usually smaller than the resolution of the Desktop. A 2048× 768 Desktop that covers two monitors might need to be scaled down to 1734×692. This is needed as the effective display area of the projected system is the largest rectangle that will fit in the union of the displays of the projectors. Thus for the above mentioned case there is a good amount of scaling that needs to take place in the horizontal direction. This scaling adds to the blurriness of the text.

Another issue is the transformation process that the display system uses to correct for the projector geometry and irregularities in the display surface. This adds to the blurriness of the text as the input is sampled and redisplayed with a different geometry.

The above two effects makes the input image look correct when projected onto the display surface through the multi-projector display, but cause an anti-alias effect. This anti-alias effect looks fine for images or movies, but causes text regions to look blurry.

To solve this problem, another aspect of the present invention is to distinguish between text regions and not-text regions. Once identified, a sharpening filter is applied to the text regions. This significantly improves the quality of the display, especially when displaying the Windows Desktop.

The method presented below describes a method to locate text regions on the Microsoft Windows Desktop and to pass the information along to the mapping and blending software of projector platform 106.

First we will discuss text region labeling on Microsoft Windows.

The Windows Application Programming Interface (API) does not provide a method to find the text regions on the display. It is possible to use the accessibility API's to find out the text of various controls, but this method is limited. It requires the pooling of the API and does not include text drawn to the screen. The method also needs to operate near real time. It cannot slow down the projector display transformation.

The method of the present invention hooks the Windows API text drawing functions. This would allow most text positioning and display information to be obtained.

To hook the text functions a CBT (Computer Based Training) Windows hook is used. The CBT hook can inject a dynamic link library (DLL) into every process. A DLL is created that will then hook the text drawing functions once it is injected into a process.

The text functions are located in several different DLL's. The first thing the injected DLL does is locate the entry point of the targeted DLL. This is accomplished by calling the GetModuleHandle function. If this function returns NULL, then that DLL is not used by the injected process. This process can be ignored for the current targeted DLL; it is not using the text functions of this DLL. It is possible that the process will load the DLL using LoadLibrary. Therefore, the LoadLibrary and LoadLibraryEx functions can be hooked to watch for the DLL's that we are interesting in, to hook their text functions.

Once the entry point of the targeted DLL is known, the entry points of the text functions are located using the GetProcAddress function. The code at the entry point will be replaced with code that will call a replacement function. The replacement function will process the redirected text function and then call the original text function. The original entry point of the text function is saved for this use.

To replace the code at the entry point the memory pages needs to be made writeable since executable pages are not usually in writable memory. The VirtualProtect function is used for this. FIG. 13 is a table of Microsoft's text functions that need to be hooked. The following is exemplary C++ code to accomplish the hooking:

```
#pragma pack(push, 1)
struct Interceptor {
#ifdef _WIN64
    unsigned char jmp[2];
    unsigned int offset;
    UINT_PTR newFunc;
#else
    unsigned char jmp;
    UINT_PTR newFunc;
#endif
};
#pragma pack(pop)
class Hook {
    void *funcToHook_;
    Interceptor newCode;
    unsigned char oldCode[sizeof(Interceptor)];
    DWORD oldMemoryProtection;
    const TCHAR *name_;
public:
    Hook(const TCHAR *aName);
    ~Hook( );
    void installHook(void *funcToHook, void *newFunc);
    void placeHookCode( );
    void placeOldCode( );
    void uninstallHook( );
    bool isHooked( );
    const TCHAR *name( );
};
#include "stdafx.h"
#include "Hook.h"
#include "IRefPtr.h"
#include "../utils.h"
Hook::Hook(const TCHAR *aName): name_(aName), funcToHook_(NULL) {
}
Hook::~Hook( ) {
    if(isHooked( )) uninstallHook( );
}
void Hook::installHook(void *funcToHook, void *newFunc) {
    dlog(2, _T("installing hook %s"), name( ));
    MEMORY_BASIC_INFORMATION mbi;
    VirtualQuery(funcToHook, &mbi, sizeof(mbi));
    if(!(mbi.Protect & PAGE_EXECUTE_READWRITE)) {
        DWORD dwNewProtection = mbi.Protect & ~(PAGE_READONLY | PAGE_EXECUTE_READ) | PAGE_EXECUTE_READWRITE;
        if(!VirtualProtect(funcToHook, sizeof(Interceptor), dwNewProtection, &oldMemoryProtection))
            verror(_T("can't change the page (0x%p) to read write permision:"), funcToHook);
    }
    memcpy(oldCode, funcToHook, sizeof(oldCode));
#ifdef _WIN64
    newCode.jmp[0] = 0xff;
    newCode.jmp[1] = 0x25;
    newCode.offset = 0;
    newCode.newFunc = (UINT_PTR)newFunc;
```

```
#else
    newCode.jmp = 0xe9;
    newCode.newFunc = ((UINT_PTR)newFunc - (UINT_PTR)funcToHook-
sizeof(newCode));
#endif
    funcToHook__ = funcToHook;
    placeHookCode( );
    dlog(2,_T("hook %s installed"), name( ));
}
void Hook::placeHookCode( ) {
    memcpy(funcToHook__, &newCode, sizeof(newCode));
}
void Hook::placeOldCode( ) {
    memcpy(funcToHook__, oldCode, sizeof(oldCode));
}
void Hook::uninstallHook( ) {
    if(!isHooked( )) return;
    dlog(2, _T("uninstall hook %s"), name( ));
    placeOldCode( );
//      if(!VirtualProtect(funcToHook__, 8, oldMemoryProtection,
&oldMemoryProtection))
//            verror(_T("can't change the page to old permisions"));
    dlog(2,_T("hook %s uninstalled"), name( ));
}
bool Hook::isHooked( ) {
    return funcToHook__ != NULL;
}
const TCHAR *Hook::name( ) {
    return name__;
}
```

Once the text functions are hooked, the location of the text area on the display is recorded. The input to the text functions contains the coordinates for the text area, but in the coordinate system of the DC (device context). The DC coordinates can be converted to screen coordinates by converting them from logical coordinates, then using ClientToScreen function. The ClientToScreen function needs a window handle, which can be obtained from the WindowFromDC function. Note, that this requires the DC to be associated with a window. Not all DC's are associated with a window. These DCs will be discussed below.

There are three cases that need to be taken into account to find the coordinates. The first case is the simplest: the entire text region is passed into the function. These coordinates are converted to screen coordinates as above and then sent to the coordinating process (described below).

The second case is where only the start (x, y) coordinate is passed to the function. Using the function GetTextExtentPoint32 or GetTabbedTextExtent, the right and bottom of the text region rectangle is calculated.

The third case is for the PolyTextOut functions. These take an array of points. Each point can then be calculated using the same method as the second case.

Also some of the functions can pass a clipping rectangle. This can also be taken into account. There are also options for various text alignments. These also can be accounted for.

Once the coordinates of the text area are known, they are sent to a coordinating process. A coordinating process is needed as the injected DLL is injected into all processes and these DLL's need to contribute their results to the whole and then the results are sent to the mapping and blending software of projector platform 106.

Each injected DLL sends the text region coordinates and the window handle that they belong with to the coordinating process. This communication is through a shared memory region. The shared memory contains a queue that each injected DLL places its data in.

The coordinating process will then check if each region is visible. If it is visible then a bit is set in a bitmap texture for the each pixel in the text region. This bitmap is in shared video memory, typically AGP memory that is shared between the video card and the CPU.

Upon each display update, the mapping and blending software of projector platform 106 will grab this bitmap texture and use in projecting the Desktop. As the mapping and blending software of projector platform 106 is processing each fragment or pixel, the bitmap texture is checked and if the corresponding bit is set then a sharpening filter is applied to that fragment. The identified text data is sent through sharpening filter 226 (FIG. 2), for example, before being displayed.

The following will describe detecting text region invalidation. The above described process identifies when and where a text region becomes visible and a bit is then set in the text labeling bitmap texture. But the process does not determine when a text region is no longer valid.

There are two approaches to handling this. One is to hook all the other Windows Drawing code and when there are updates to a labeled text region in the bitmap texture, mark it as needing invalidation, The GPU code can the redisplay this area with no filtering and make it as not containing text.

The other method is upon each frame update to compare the text area regions and see if they have changed. This would mean that the bitmap of each area needs to be saved for the comparison. Upon a change the text labeling in the bitmap texture could be marked as invalidated.

The following discusses memory device contexts (DCs). Some applications do not draw their text directly to a window device context (DC). They create an off-screen memory DC and draw to that instead. This is a case where the DC has no associated window as was mentioned above. To handle this situation, each DC that text is drawn into needs to be kept track of. When it is bit-block transferred to a DC with an associated window then the location of the text region can be determined.

For each memory DC, a list of the locations of the text regions drawn will be kept. Upon the bit-block transfer (blit) this can be used to calculate the text region in screen coordinates as above and processing can continue as above. The DCs are also retained if the first method of invalidation is chosen, so it can be monitored if the text area has been invalidated. Upon the blit of the DC with invalidation areas, the bitmap texture bits can be marked invalidated. This invalidated list is also kept.

To keep the list of DC's and associated data from growing forever, the DeleteDC function is hooked. When this function is called with one of the recorded DC's in the list, it will be removed from the list.

Another aspect of the present invention is a font substitution method that sharpens the display of the Windows Desktop when projected from the large scale multi-projector display system described above. The following discussion is directed to this font substitution feature of the present invention.

In the large scale multi-projector display system described above, the input data goes through the projector platform 106 to transform (map/blend) the input so that the projected display looks correct across the multiple projections. The transformation corrects for the differences in projected geometry on the display surface, color inconsistency among the projectors, and irregularities in the display surface. All this processing has an effect on the quality of the projected display. The transformation may degrade the quality of the original input data. It is therefore desirable to minimize the effects of the transformation.

In effect, the transformation creates an anti-aliased version of the input. This effect results in a good appearance for graphical media such as photos and movies, but may cause the fonts displayed to lose their sharpness.

The following description assumes that the Microsoft Windows Desktop is rendered as discussed above, with reference to FIG. 3 for example. As discussed above, the drawing of the Desktop is redirected to "off-screen" or mirrored buffers, transformed by projector platform 106, and then displayed (projected). The following description is primarily concerned with the font substitution.

The first step is to get the font data. To get access to the font data a dynamic library link (DLL) is injected into every process. This is accomplished by a Computer Based Training (CBT) hook. Once the DLL is injected the Windows Graphics Device Interface (GDI) text drawing functions will be hooked. Once hooked, the text location and the font information can be retrieved.

Once the functions are hooked the font will be replaced by another font or the rendering will take place in an off-screen area (e.g. buffers) and blitted (bit-block transferred) directly to the same location as the original text on the display.

Figure 14:
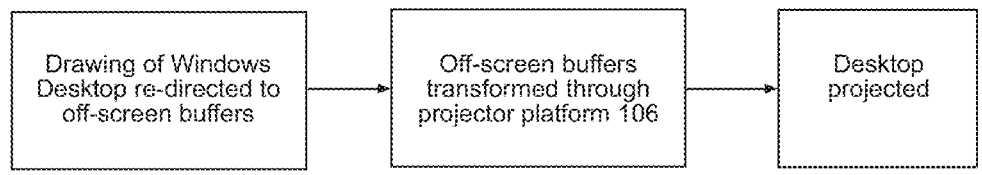
FIG. 14 is a simplified illustration of the Desktop drawing pipeline in one aspect of the present invention.

In the method of the present invention, the text is drawn, but preferably transformation is bypassed for the drawn text. Thus, these fonts would not be distorted. FIGS. 13 and 14 illustrate, simply, this feature of the present invention. FIG. 13 shows the method discussed above (and detailed in FIG. 3). The drawing of the Windows Desktop is re-directed to the off-screen buffers (mirrored swap chain buffers). Their contents are modified (transformed) by projector platform 106 and then projected by projectors 102. FIG. 14 illustrated the feature of font substitution. Again, the drawing of Windows Desktop is re-directed to the off-screen buffers but the drawing will not include text data. Also again, the contents of the buffer (specifically the front buffer) are modified (transformed) by projector platform 106 and then projected by projectors 102. This projection will not include text. Instead, the text information will be processed separately as discussed below and the text will be drawn with substituted fonts.

The first issue discussed in this feature of the present invention is the determination of the replacement font. There are two cases that will be discussed.

The first situation is when a font can be directly substituted for the current font. In this case, the transformation of the drawing of the Windows Desktop does not create much distortion to the display and a suitable font can be found that can be drawn into this area.

The second case is when the first case fails. The text is rendered in a font to an off-screen bitmap. The font chosen will be one that is best suited for the transformation. The size of the off-screen bitmap will be adjusted for best results also.

In the first case the geometry of the transformed text region is close to that of a simple transform of a different font. The transformations to consider are scale, rotation, and perspective. A simple example is that of a super bright mode discussed above. Super bright combines multiple superimposed projectors into one bright display. The effective area of the projected display will be similar to the Desktop, but will be slightly smaller, possibly at a slight rotation, and might have a slight perspective transformation. In this case, a smaller font is selected in place of the larger font that goes through a transformation. This small font is then drawn directly to the display surface (projected) without going through the transformation. The result would be seen as a higher quality sharper font with little or no observable changes seen in the text region. In other words, the text region would look as if it fits normally in the scene.

The algorithm for the transformation code specifies the scale, rotation, and translation for each corner of the text region of interest. These combined parameters for each corner of the text region will specify the perspective transformation. This can be pre-computed as the transformation is fixed for s particular session of the display system. The granularity of the system is independent of this method. For example, a homography based approach might divide each projected display into 7×7 quadrants or a fined grained approach might have this information for each pixel of the display.

The one assumption made is that the text region's rectangle is close to a rectangle before and after the transformation. A measurement is made to determine this. The measurement will measure the straightness of each side of the rectangle. If it is not close to linear then the font substation is not performed. Alternatively we can perform the font substitution, but instead of using the entire text region as the area of interest, the bounding rectangle of each individual letter will be used. The decision point then becomes, if the text area is close to a rectangle, use the entire text region as the area of interest, else use the bounds of each letter as the area of interest.

Handling each character separately can possibly cause problems with italicized fonts and kerning issues. To avoid these, kerning is taken into account. Each character will be rendered separately with the correct kerning taken from the font information for the surrounding characters.

In effect, any perspective transformation is ignored. The concern is then the rotation and scale. The task then becomes, given the scale and rotation of the area of interest, can a font with suitable characteristics be found to fit the given area?

The first step is to remove the rotation and only be concerned with the scale. Once the font with a suitable scale can be determined, the rotation can then be added back in. So, first we find the correct font size.

When the Desktop is projected it is usually scaled more in one axis than the other. Usually there is a significant more scaling in the horizontal direction than the vertical. The first step is to determine the major axis. For our purposes, the major axis is the one with the largest scale factor. The other axis will be the minor axis.

The minor axis is used to choose the font size. The first step is to find a font that can fit in the text region and have a similar layout. This is performed using a search of the font space by varying the point size of the font. This is typically a binary search. The starting point will be the current font and point size. The text layout can be examined with the GetCharacterPlacement Windows API function.

Bitmap fonts are set to fixed point sizes. To perform the font substitution the bitmap font will be substituted with a suitable outline font. This can be determined apriori for the common Windows bitmap fonts; otherwise the fonts will have to be enumerated to find one with similar characteristics.

The next step is font rendering. Once the point size of the font is known, there are two approaches to rendering the text. The first is to obtain the glyph information. This can be accomplished with the Windows API function GetGlyphOutline. Then the glyph can be rendered with this information and the layout information obtained above. The issue with this approach is that a font rendering engine needs to be provided, but even a simple rendering engine will produce better results than without. This method is also better than the second method. The GetGlyphOutline function has an added benefit in that it also lets us scale (and rotate if necessary) the individual glyphs.

The second method involves rendering the text to an off-screen bitmap then scaling and rotating the bitmap to fit the text region of interest. Note that the region should only need to be scaled along the major axis as the font point size is selected t fit the minor axis.

The advantage of this method is that a font rendering engine is not needed. The results will not be quite as good as the first method, but still better than without. Also, the Windows API is geared toward this method, as its text system is limited in drawing horizontal, pixel aligned characters.

The above method takes some time. The chosen font does not change much per region, so a font cache is maintained for each area and font. It is based on the area as the scale, rotation, and translation varies at each area and a different font size could be chosen. Of course similar font cache entries will be grouped together. The data that needs to be maintained is the area this font pertains to, the font name/handle, and the font size.

The following discusses a second method that is appropriate when the text area of interest is not rectangular. This can happen even when considering individual characters, for example, if the font point size is very large, such as a Power Point slides, and the individual character transformation does not maintain a nearly rectangular area.

This second method assumes that the input data is going to be transformed. In this case can the font be chosen in a way that is better than the original font? To get a better scaling it is always better to go from larger to smaller, to down scale. This scaling goes from having information to losing some, but no information has to be created.

So in this approach the transformation code on the GPU needs to be able to scale down an input region. The area of interest will be drawn off-screen at a larger size then the transformation process will scale it down appropriatly.

Figure 15:
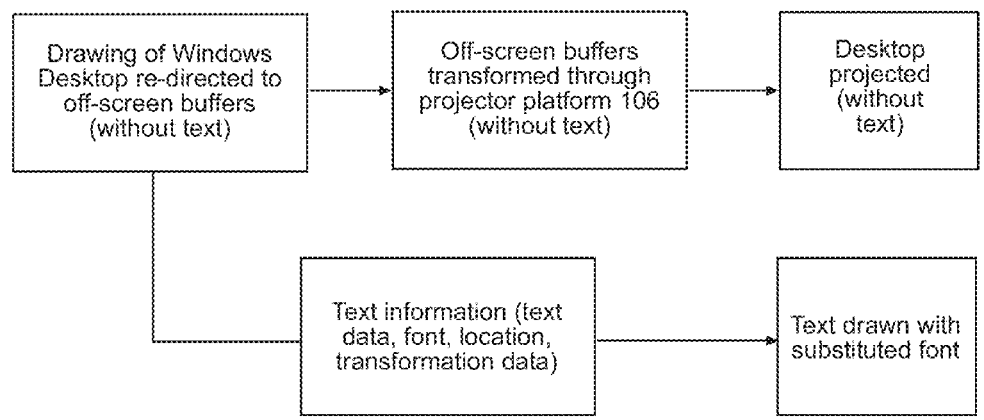
FIG. 15 is a simplified illustration of the Desktop drawing pipeline in the font substitution aspect of the present invention.

The following summarizes the first method described above and as shown generally in FIG. 15. It works with the projector platform 106 that scales the Desktop to an extent for the multiple-projector display:

1. get the extent and mid point of each character to be displayed,
2. look up the midpoint and extent of each character in the Desktop,
3. find the font size of the current drawing font that will fit in scaled extent of the minor axis
4. get the glyph outline information from Windows and scale the major axis and rotate to fit the scaled extent,
5. render the text in the specified font.

Note that there should not be any great point size changes between fonts chosen between characters in a text region.

Various embodiments of the present invention can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output.

Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices, i.e. computer readable media, suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of modifying the execution of an operating system's draw management software that draws a graphical user interface, GUI, the method comprising:
   identifying first swap chain buffers defined by said operating system and used by the draw management software to update said GUI, said first swap chain buffers being defined for a first display area;
   defining mirrored swap chain buffers defined for a second display area larger than said first display area, said mirrored swap chain buffers holding data content different from said first swap chain buffers;

identifying drawing updates issued by said draw management software and directed to said first swap chain buffers;

re-directing said drawing updates to said mirrored swap chain buffers;

modifying contents of a front buffer of the mirrored swap chain buffers;

drawing the second display area using the modified contents of the front buffer of the mirrored swap chain buffers, wherein the second display area replaces the first display area as the graphical user interface;

injecting a non-operating system software function into a memory space of the draw management software, said non-operating system software function being responsive to drawing updates directed to said first swap chain buffers and redirecting them to said mirrored swap chain buffers;

hooking hardware-accelerated function calls that are used to display the first display area; and using multiple projectors to create a projected display of the second display area, including:

assigning a partial display region of said second display area to each one of the multiple projectors;

identifying a main partial display region that displays a user-interface menu; and shifting the main partial display region until the main partial display region is in an upper left corner of the projected display;

wherein prior to shifting the main partial display region, identifying a number V of partial display regions to the left of the main partial display region that are visible in the projected display;

identifying a number L of partial display regions to the left of the main partial display region, the number L including the main partial display region;

identifying a number R of partial display regions to the right of the main partial display region; and shifting the main partial display region to the left by n partial display regions, where n=L−V+R.

2. A device modifying the execution of an operating system's draw management software that draws a graphical user interface, GUI, said device comprising:

one or more processors that identify first swap chain buffers defined by said operating system and used by the draw management software to update said GUI, said first swap chain buffers being defined for a first display area;

define mirrored swap chain buffers defined for a second display area larger than said first display area, said mirrored swap chain buffers holding data content different from said first swap chain buffers;

identify drawing updates issued by said draw management software and directed to said first swap chain buffers;

re-direct said drawing updates to said mirrored swap chain buffers;

modify contents of a front buffer of the mirrored swap chain buffers; and draw the second display area using the modified contents of the front buffer of the mirrored swap chain buffers, wherein the second display area replaces the first display area as the graphical user interface;

inject a non-operating system software function into a memory space of the draw management software, said non-operating system software function being responsive to drawing updates directed to said first swap chain buffers and redirecting them to said mirrored swap chain buffers;

hook hardware-accelerated function calls that are used to display the first display area; and using multiple projectors to create a projected display of the second display area, including:

assigning a partial display region of said second display area to each one of the multiple projectors;

identifying a main partial display region that displays a user-interface menu; and shifting the main partial display region until the main partial display region is in an upper left corner of the projected display, wherein prior to shifting the main partial display region, said one or more processors further:

identify a number V of partial display regions to the left of the main partial display region that are visible in the projected display;

identify a number L of partial display regions to the left of the main partial display region, the number L including the main partial display region;

identify a number R of partial display regions to the right of the main partial display region; and shift the main partial display region to the left by n partial display regions, where n=L−V+R.

3. A non-transient computer-readable medium embodying instructions executable by a computer to perform the method of claim 1.

* * * * *